Nov. 15, 1949

A. MAYER 2,488,310

WATER CRAFT WITH HORIZONTAL BUOYANT PROPELLER DRIVE

Filed Aug. 6, 1946

INVENTOR
Augustine Mayer
BY
Pennie, Edmonds, Morton and Barrows
ATTORNEYS

Nov. 15, 1949     A. MAYER     2,488,310
WATER CRAFT WITH HORIZONTAL
BUOYANT PROPELLER DRIVE
Filed Aug. 6, 1946     2 Sheets-Sheet 2
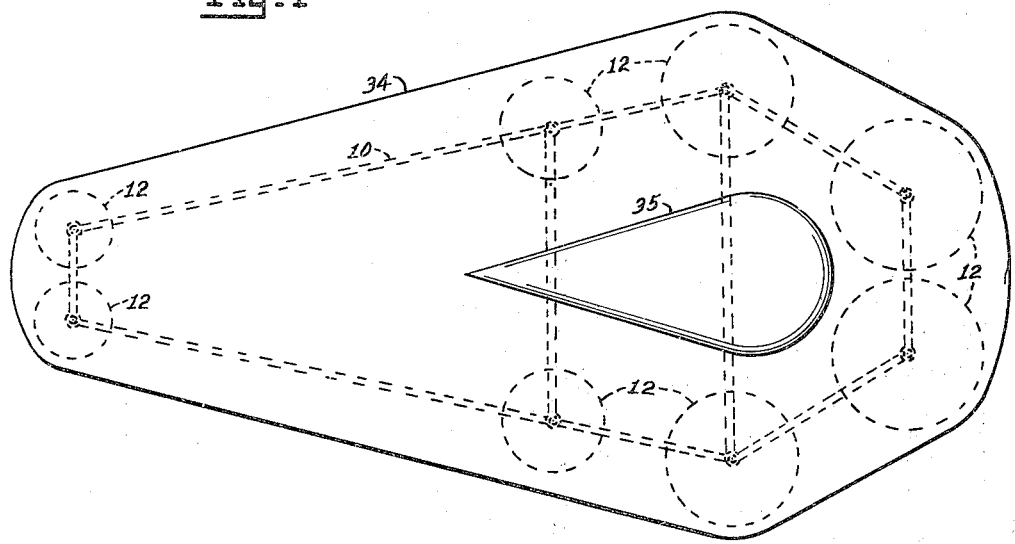
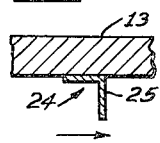 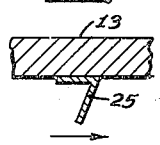 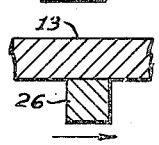 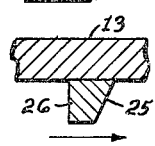
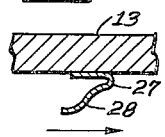 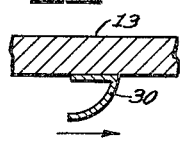 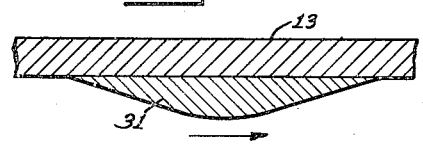
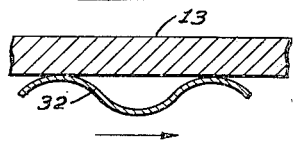 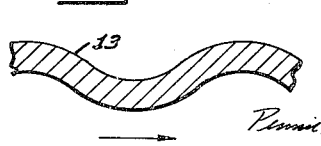
INVENTOR
*Augustine Mayer*
BY
*Pennie, Edmonds, Morton and Barrows*
ATTORNEYS Patented Nov. 15, 1949

2,488,310

UNITED STATES PATENT OFFICE 2,488,310

WATER CRAFT WITH HORIZONTAL
BUOYANT PROPELLER DRIVE

Augustine Mayer, Jackson Heights, N. Y.

Application August 6, 1946, Serial No. 688,768

3 Claims. (Cl. 115—19)

1

This invention relates to water craft and, more particularly, to novel means of supporting and propelling water craft.

The conventional water craft comprises a bulky hull which, when propelled, plows through the water. The massive resistance of water to the movement of a hull therethrough is so great that the power required for propelling it increases as the cube of the linear speed. Extremely high speed water craft of the hydroplane type reduce this plowing resistance to a relatively low value by planing adjacent the surface of the water. In spite of the fact that a hydroplane at high speed draws only a shallow draft, some plowing action remains and a very high resistance to its movement through the water is provided by frictional drag of the hull surface in contact with the water.

It is an object of the present invention to provide a water craft particularly adapted to travel at high speed with a minimum of water resistance. This result is obtained in accordance with the present invention by supporting and propelling the craft by a novel device whereby the craft literally runs on the water rather than through the water.

The water craft of the present invention comprises a body frame and a plurality of supporting members mounted on the frame. The supporting members are movably mounted on the frame and are capable of supporting the craft by dynamic action and reaction between the members and the water when the members are moved with respect to the water. The supporting members are advantageously capable of supporting the craft by displacement buoyancy when the members are at rest. The supporting members in a now preferred embodiment of the invention comprise rotatable annular floats capable of supporting the craft by their displacement buoyancy. The lower surface of each float is provided with reaction surfaces such as to further raise the craft and reduce the area of the float in contact with the water by the dynamic reaction between the reaction surfaces and the water when the floats are rotated. The reaction surfaces are advantageously such as to also provide propulsion of the craft.

These and other novel features of the invention will be more fully understood by reference to the accompanying drawings, in which.

2

Figure 2:
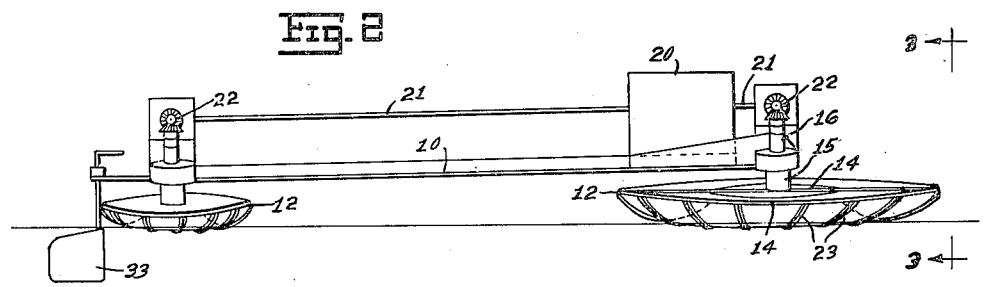
Fig. 2 is a side elevation of the craft shown in Fig. 1.
Figure 3:
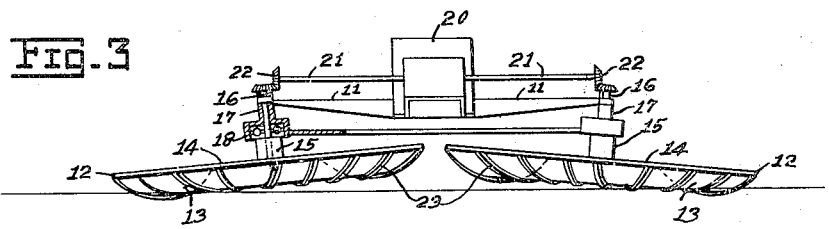
Figure 14:
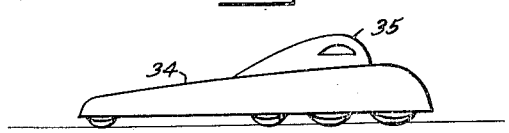

Fig. 3 is a front end view taken along line 3—3 in Fig. 2;

Fig. 4 is a top plan view of another modification of the water craft of the invention;

Figs. 5 through 13 show the cross-sectional shape of various reaction surfaces of the invention; and Fig. 14 is a side elevation of the craft shown in Fig. 4.

The water craft comprises a main frame 10 provided fore and aft with cross arms 11 appropriately braced to the main frame. A supporting member 12 is mounted at the end of each cross arm. The craft is advantageously supported and propelled solely by the supporting members 12.

In a now preferred embodiment of the invention, each supporting member comprises an annular float 13, as shown in Fig. 3. The float is provided with a suitable frame 14 provided centrally with a hub 15. The hub 15 is secured to a shaft 16 rotatably mounted adjacent the end of the cross arm 11 in a main bearing 17 and supporting bearings 18. The float shaft 16 is driven by a motor 20 connected thereto by suitable shafts 21 and gears 22.

The floats 13 and their supporting shafts 16 are so mounted on the cross arms 11 as to be inclined in a downwardly outboard direction. The lowermost portion of each float rests in the water and supports the craft by the displacement buoyancy of this portion of each float. The size, and hence the displacement, of the supporting floats 13 is preferably such that when the floats (and hence the craft) are at rest (as shown in Fig. 3) only a minor segment of each annular float will be in contact with the water, the larger portion of the annulus extending above the surface of the water. The upper surface of the floats may be provided advantageously with a suitable covering so as to render them completely watertight.

The lower surface of each annular float is provided with a plurality of reaction surfaces 23 capable of raising the craft in the water when the annular floats are rotated at high speed. The only reaction surfaces which will be in contact with the water are those adjacent the portion of the annular float 13 which rests in the water. The reaction surfaces are such that their movement with respect to the water effects by dynamic reaction between the reaction surfaces and the water a thrust having two components. One component of this reaction acts upwardly against the reaction surfaces so as to tend to raise the craft in the water and the other component tends to propel the craft in the direction opposite to that of the direction of movement of the reaction surfaces with respect to the water.

The reaction surfaces may comprise, for example, a plurality of vanes 24 (Fig. 5) each resembling an angle iron secured to the lower surface of the float 13. Due to the inclination of the float with respect to the surface of the water, the depending surface of the vane (that is, the front surface 25) enters the water at a slant in the direction of the arrow (Fig. 5) as it is carried around by the rotating float 13. This slanting front surface 25 meeting the water bears downwardly against the water, and when the slanting surface enters the water at high speed the water exhibits such incompressibility as to cause the slanting surface to ride upwardly. This dynamic reaction tends to cause the float 13 to rise in the water. When the float is rotated at sufficient speed, the reaction will be of such magnitude as to raise the float substantially out of the water, leaving only the rapidly moving vanes as the supporting means for the craft.

The floats mounted on opposite ends of each cross arm 11 are rotated in opposite directions such that the reaction surfaces at the outboard portion of each float enter the water travelling toward the stern of the craft. Thus, the second (driving) component of the dynamic reaction created by the reaction surfaces will be a driving force resulting from movement of the vanes 24 in the aft direction while in contact with the water.

Figure 1:
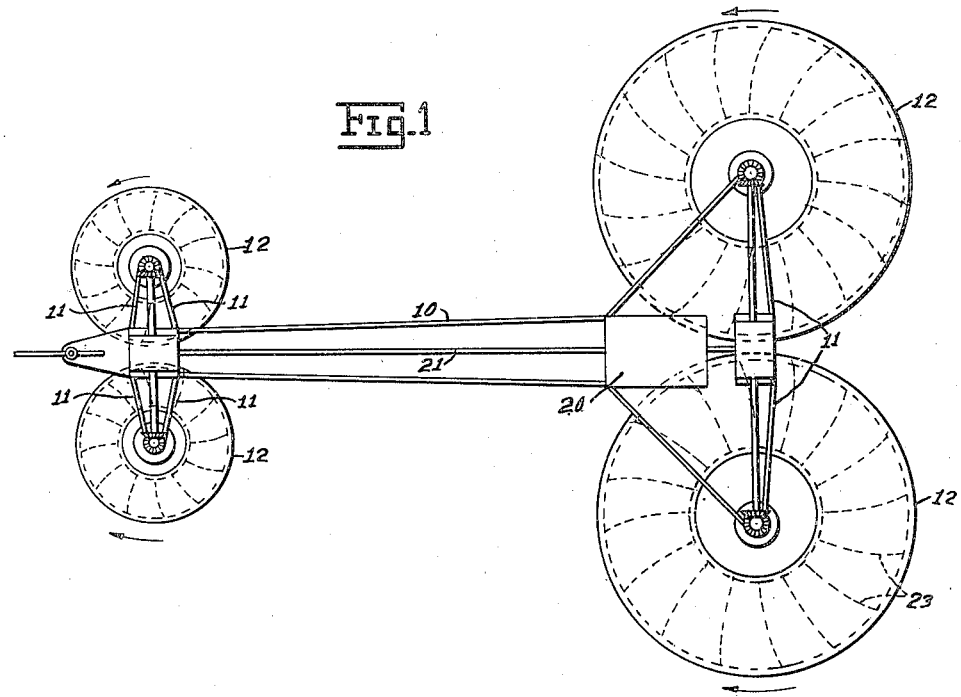
Fig. 1 is a top plan view of the novel water craft.

As shown in Fig. 1, the reaction surfaces 23 are arranged advantageously somewhat spirally adjacent the lower surface of the floats 13. The purpose of this spiral arrangement is to permit each reaction surface or vane to enter the water somewhat obliquely to its direction of movement. By entering the water obliquely the shock of the contact between the vane and the water is appreciably reduced, thus contributing to smoother operation and a minimum of splashing.

The reaction surfaces may be of many other different shapes, as shown in Figs. 6 through 13. For example, they may comprise an angle iron shape having an acute angle (Fig. 6) rather than the right angle shown in Fig. 5. The increased slant of the front or reaction surface 25 tends to provide greater lift and less forward drive than the right-angled surface shown in Fig. 5. The reaction surface may comprise the face of an element such as a wooden strip 26 having a rectangular cross-section as shown in Fig. 7. The reaction surface 25 of the strip 26 may be bevelled, as shown in Fig. 8, to provide a greater slant as the reaction element enters the water. As shown in Fig. 9, the reaction surface may be sinusoidal, the surface of greatest slant 27 being nearest the lower surface of the float 13 so as to produce maximum lift when the float is immersed in the water. The sinusoidal reaction surface of least slant 28 will then provide the dynamic reaction when the float has attained high speed rotation (with the float lifted above the water) and will thus provide a maximum driving component. The reaction surface may advantageously have the curved shape 30 shown in Fig. 10, or it may have the slightly curved forward and backward slanting shape 31 shown in Fig. 11. The reaction surface may also comprise a corrugated member 32 as shown in Fig. 12 having a sinusoidal or other desired cross-sectional configuration. As shown in Fig. 13 the lower surface of the float 13 may itself be corrugated or otherwise shaped to provide desired reaction surfaces.

The optimum shape and slant of the reaction surfaces will depend upon the weight of the craft, the amount of power available, and the inclination of the annular floats. In view of the fact that the novel supporting and driving device of the invention is particularly adapted to high speed water travel, the weight of the craft should not be excessive. The weight and available power will depend on the power unit, a lightweight internal combustion engine being particularly advantageous for use in accordance with the invention. I have found that an inclination of the floats at about 5 degrees from the horizontal produces effective results, although greater or less inclination may be used with advantage.

Steering of the craft may be effected by a conventional rudder 33 mounted at the stern of the craft or by causing the reaction surfaces to produce a different amount of driving component on opposite sides of the craft, or by a combination of both means. A difference in the driving component on opposite sides of the craft may be obtained readily by increasing or decreasing the speed of rotation of a float on one side of the craft with respect to the speed of rotation of the float on the other side. When steering is effected by control of the driving component of the reaction surfaces, the craft will tend to turn in the direction of the side provided with less driving component.

Any number of supporting members may be used. For example, the craft may be provided with one pair of supporting members forward and a second pair of supporting members aft as shown in Fig. 1. Although the forward and aft supporting members may be of the same size and disposition with respect to the centerline of the craft, it is particularly advantageous to use members of different size or disposition from the centerline, or both, in order that the reaction surfaces of trailing supporting members will make contact with water comparatively undisturbed by the wake of a leading supporting member. Thus, as shown in Fig. 1, where the craft is provided with two pairs of supporting members, the members of one pair are of greater diameter than the members of the other pair. Although the craft shown in Fig. 1 is provided with the larger pair of supporting members forward, the smaller pair may advantageously be made the leading pair with the larger members positioned adjacent the stern of the craft. In the craft shown in Fig. 4, four pairs of supporting members 12 are provided, the size and disposition of each pair of members with respect to the centerline of the craft being such that the reaction surface of each member in contact with the water is clear of the wake or disturbance created by any and all leading supporting members.

It will be seen that when the craft is in normal operation, with the reaction surfaces engaging the water at high speed, the craft will tend to run on rather than through the water. Movement of the craft is thus unhindered by the resistance of the water to the plowing action of the hull of a conventional water craft. Furthermore, movement of the reaction surfaces of my novel craft with respect to the water is always in a direction opposite to the movement of the craft. In other words, the movement of the reaction surfaces is in the same direction as the movement of the water with respect to the craft when the craft is in motion. Thus, contact between the reaction surfaces and the water, in addition to providing lift, provides forward thrust against the water rather than any frictional resistance to the forward movement of the craft. In this respect the water craft of the invention offers an outstanding advantage over other high-speed water craft of the hydroplane type in that the supporting members offer no drag resistance between themselves and the water.

The craft is advantageously enclosed with a body covering not only to enhance its appearance but to lessen wind resistance. Thus, as shown in Figs. 4 and 14, the body covering 34 advantageously encloses not only the frame 10 but also the supporting members 12 and may be provided with a suitable cab 35 for the operator. The streamlined or teardrop shape of the body covering is particularly adapted to the use of large supporting members forward and smaller supporting members aft. This form of body covering lends itself advantageously to the use of more than two pairs of supporting members, as shown in Figs. 4 and 14, so that by using an increased number of supporting members greater lift and greater speed are made possible.

Although the supporting members have been described herein as providing the sole means of support for the craft when the members are at rest and as providing supporting and propulsion of the craft when the members are set in motion, it must be understood that the invention is not so limited. For example, the supporting members may be used with advantage on a craft provided with separate means for support in the water when the supporting members are at rest, the supporting members in operation providing both propulsion and lifting of the craft to raise the separate supporting means substantially above the surface of the water. Furthermore, the supporting members may be used principally or solely to support the craft as described hereinbefore, other means being used to effect propulsion of the craft.

I claim:

1. A water craft comprising a body frame and a plurality of rotatable annular buoyant floats mounted on said frame, the plane of each float being inclined in a downwardly outboard direction and the lower surface of each float being provided with a plurality of downwardly depending reaction surfaces, and means for rotating the floats, said reaction surfaces adjacent the outboard portion of each inclined float thrusting against the water when the floats are rotated and thereby providing a dynamic reaction having two components, one reaction component providing lift for the craft and the other reaction component providing propulsion for the craft.

2. A water craft comprising a body frame and a plurality of rotatable annular buoyant floats mounted on said frame, the plane of each float being inclined in a downwardly outboard direction and the lower surface of each float being provided with a plurality of downwardly depending substantially radially disposed vanes, and means for rotating the floats, said vanes adjacent the outboard portion of each inclined float thrusting against the water when the floats are rotated and thereby providing a dynamic reaction having two components, one reaction component providing lift for the craft and the other reaction component providing propulsion for the craft.

3. A water craft comprising a body frame and a plurality of rotatable annular buoyant floats mounted on said frame, the plane of each float being inclined in a downwardly outboard direction and the lower surface of each float being provided with a plurality of substantially radially disposed reaction surfaces comprising vanes which depend downwardly and rearwardly with respect to the direction of rotation of the float, and means for rotating the floats, said vanes adjacent the outboard portion of each inclined float thrusting against the water when the floats are rotated and thereby providing a dynamic reaction having two components, one reaction component providing lift for the craft and the other reaction component providing propulsion for the craft.

AUGUSTINE MAYER.

REFERENCES CITED

The following references are of record in the file of this patent:

UNITED STATES PATENTS

| Number | Name | Date |
|---|---|---|
| 855,510 | Heroult | June 4, 1907 |
| 1,049,661 | Bretney | Jan. 7, 1913 |
| 1,738,410 | Weir | Dec. 3, 1929 |
| 1,911,827 | Knaus | May 30, 1933 |

FOREIGN PATENTS

| Number | Country | Date |
|---|---|---|
| 24,135 | Great Britain | May 18, 1910 |
| 306,778 | Great Britain | Feb. 28, 1929 |
| 817,461 | France | May 24, 1937 |